(12) United States Patent
Sell

(10) Patent No.: US 8,782,007 B1
(45) Date of Patent: Jul. 15, 2014

(54) EFFICIENT DATA MOVEMENT

(75) Inventor: Kenneth A. Sell, Sunnyvale, CA (US)

(73) Assignee: EMC Corporation, Hopkinton, MA (US)

( * ) Notice: Subject to any disclaimer, the term of this patent is extended or adjusted under 35 U.S.C. 154(b) by 73 days.

(21) Appl. No.: 12/983,165

(22) Filed: Dec. 31, 2010

(51) Int. Cl.
*G06F 7/00* (2006.01)
*G06F 17/00* (2006.01)

(52) U.S. Cl.
USPC .......................................................... 707/659

(58) Field of Classification Search
USPC ................................. 707/659, 655, 640, 600
See application file for complete search history.

(56) References Cited

U.S. PATENT DOCUMENTS

| | | | | |
|---|---|---|---|---|
| 5,852,715 | A * | 12/1998 | Raz et al. | 709/201 |
| 6,640,278 | B1 * | 10/2003 | Nolan et al. | 711/6 |
| 7,649,892 | B2 * | 1/2010 | McGee et al. | 370/395.4 |
| 7,653,754 | B2 | 1/2010 | Kagan et al. | |
| 7,934,020 | B1 | 4/2011 | Xu et al. | |
| 8,447,860 | B2 | 5/2013 | Suman et al. | |
| 2006/0173956 | A1 | 8/2006 | Ulrich et al. | |
| 2007/0028145 | A1 | 2/2007 | Gerhard et al. | |
| 2009/0193413 | A1 | 7/2009 | Lee | |
| 2011/0055427 | A1 | 3/2011 | Das | |

FOREIGN PATENT DOCUMENTS

WO 2005/119463 12/2005

* cited by examiner

*Primary Examiner* — Usmaan Saeed
*Assistant Examiner* — Paul Kim
(74) *Attorney, Agent, or Firm* — Theodore A. Chen; Krishnendu Gupta

(57) ABSTRACT

A method, article of manufacture, and apparatus for processing information are disclosed. In some embodiments, this includes collecting information about a database, determining a first disk to read from based on the collected information, determining a second disk to write to based on the collected information, and performing a write operation on the second disk. In some embodiments, a read operation may be performed on the first disk contemporaneously with the write operation on the second disk, and the read operation may be the only operation performed on the first disk at a time.

15 Claims, 4 Drawing Sheets

EFFICIENT DATA MOVEMENT

CROSS-REFERENCE TO RELATED APPLICATIONS

This application is related to co-pending U.S. patent application Ser. No. 12/983,172 for DYNAMIC DATA MOVEMENT and filed concurrently herewith, which is incorporated herein by reference for all purposes.

FIELD OF THE INVENTION

The present invention relates generally to information storage systems, and more particularly, to systems and methods of processing information.

BACKGROUND OF THE INVENTION

Modern databases typically contain large amounts of information that are spread across hosts. Adding to the large amount of information is the need for enhanced reliability. Many databases retain two copies of data, commonly referred to as a primary and mirror copy, to guard against data loss and generally enhance the reliability of the database.

When a database needs to be upgraded, or more generally, when data needs to be moved or migrated from one location to another, some of, or all of database may be offline. This downtime may result in a significant loss of revenue, especially if the database keeps track of commercial transactions. Migrating a large database from host to host, and synchronizing the new primary copy with the new mirror copy may be especially time consuming.

There is a need, therefore, for an improved method, article of manufacture, and apparatus for processing information.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
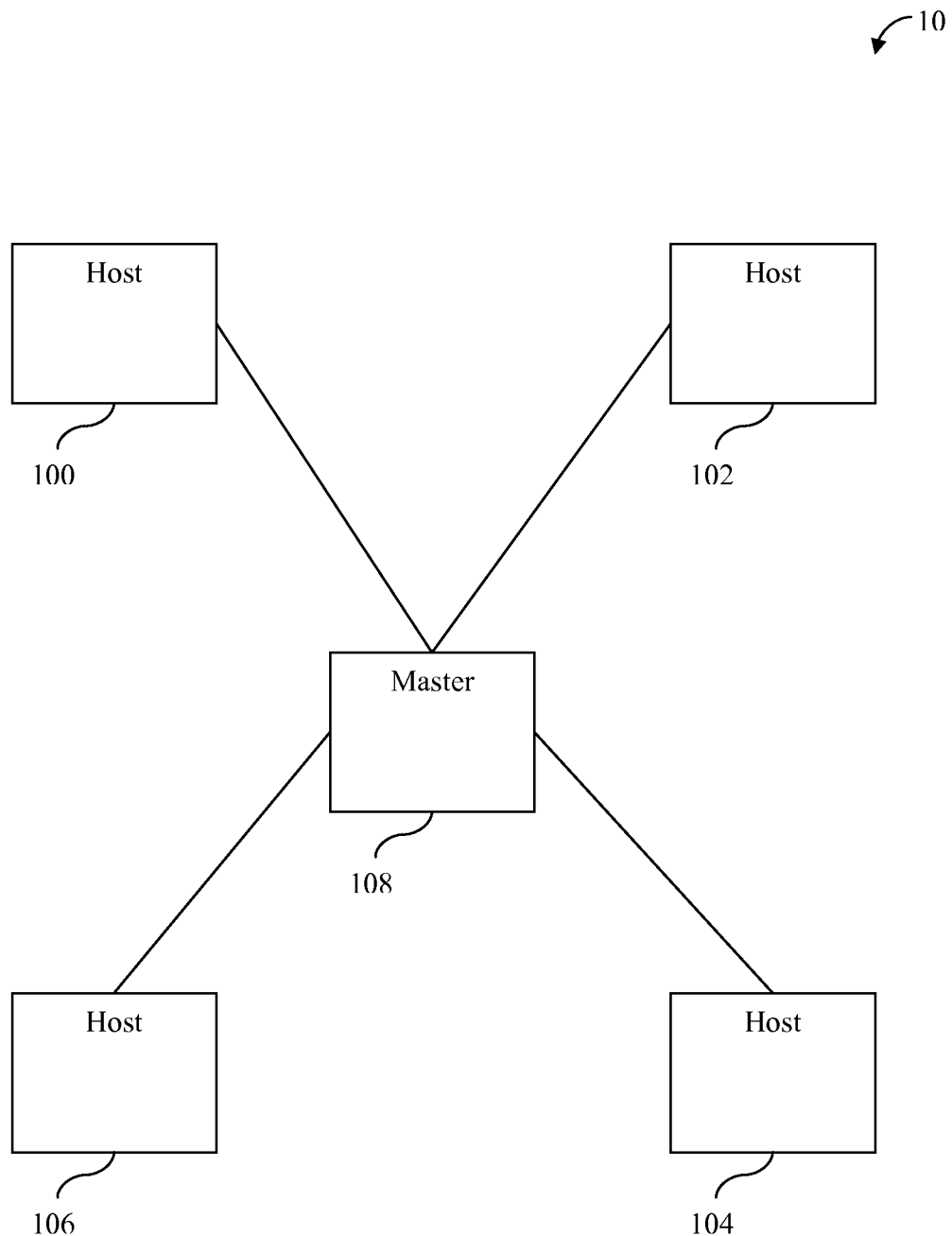
FIG. 1 is a diagram of a database with a master and four hosts.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to data storage systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Disclosed herein are a method and system to efficiently process information. Conventional methods for moving data between hosts typically involve reading and writing data to a disk contemporaneously. However, reading and writing to the disk contemporaneously reduces data throughput, resulting in a longer migration period. It is more efficient for a disk to perform a read operation or write operation consecutively, rather than switch between the two. Further, reads and writes going through random network interface cards (NICs) may not utilize available subnets in an efficient manner. The enhanced techniques described herein restrict a disk to one operation (e.g. a read or a write) at any given point in time, and in some embodiments, utilize available subnets in an efficient manner.

Before moving or migrating data from one host or another, it may be preferable to collect configuration information. This may be referred to as a configuration phase. During the configuration phase, information about the system (e.g. number of hosts, number of disks, number of NICs, capacity of NICs, etc.) may be gathered, and based on the gathered information, a plan for data movement may be generated. In some embodiments, the configuration information may be gathered by a master. As illustrated in FIG. 1, Database 10 contains Hosts 100, 102, 104, 106, and Master 108. Hosts 100, 102, 104, and 106 are connected to Master 108. Master 108 has information about the hosts connected to it, such as how many disks (virtual or physical) are in each host, and how many NICs each hosts has, among others. It should be noted that although FIG. 1 illustrates only four hosts, any number of hosts may be connected to a master. Further, a host may itself be a master to other hosts. This may be preferable in some embodiments where there are a large number of hosts, and it is not feasible to connect all the hosts to a single master. Rather, a subset of hosts connects to a host, and the host connects to the master.

In some embodiments, an algorithm may be used during the configuration phase to ensure that a disk is only read or written to at any given point in time. This may include retrieving and examining configuration information, such as the location of the source and target (e.g. source host, source disk, target host, target disk, etc.) The algorithm may use this configuration information to organize data movement, such as when the data moves, where the data goes, and where the data comes from.

An example of an algorithm used in a primary-mirror system may be the following:

Get a list of all hosts in a database system

For each host, make a list of primary and mirrors on that host such that a primary is in the same location on its list as a mirror with the same disk location Go through the list of hosts and circular shift the location of the mirror list entries by the host number. For example, for host 1, shift the mirror entries down by 1, and put the last entry at the beginning of the list. For host 2, shift the mirror entries down by two, and put the last two entries on the beginning of the list. Continue for all entries on a mirror list.

Shift mirror list by host number modulo (%) the number of mirrors per host.

Now there are two lists for each host. List one is the list of primaries on the host, list two is the list of mirrors on that host, and are ordered in a way that primary disks (or mounts) are always read from and mirror disks (or mounts) are always written to.

In some embodiments, hosts may have a different number of network interface cards (NICs). For example, one host in a cluster may have 2 NICs while another host in the same cluster may have 4 NICs. Further, these NICs may have varying capacities (e.g. 1 GB/s, 10 GB/s, etc.). It may be preferable to take into consideration the network throughput of each host. In some embodiments, this may include running a test movement of data to estimate network throughput. For example, a first NIC on a first host and a second NIC on a second host may be selected. An amount of data may be transferred using the selected NICs. The amount of data may be pre-determined, and generated on the fly or before the transfer of data. Once the transfer of data is complete, the time it took to transfer the data may be used to estimate network throughput.

In some embodiments, the transfer of data may be based on size and disk location. For example, it may be preferable to send 10 GB chunks of data at a time from one disk to another, with smaller files prioritized. To illustrate, suppose there are five files on a first disk. The first file is 1 GB, the second file is 2 GB, the third file is 3 GB, the fourth file is 4 GB, and the fifth file is 5 GB. If all five files were to be migrated to a second disk in 10 GB chunks, it would require two chunks to move all five files. The first chunk may contain the first 3 files (1+2+3=6 GB), while the second chunk may contain the last 2 files (4+5=9 GB).

Prioritizing smaller files may also lower the total time of migration. More often than not, databases contain "zero length" files, or files that take up very little space. Migration programs, such as scp (secure copy), can quickly dispose of zero length files. If many small or "zero length" files were in the first 10 GB chunk transferred, a substantial number of files can be migrated in a more efficient manner than if they were spread across multiple 10 GB chunks. Other programs may be used, such as rsync.

In some embodiments, limiting the number of files in each chunk may be preferable. For example, a policy may dictate that only five hundred files may be in one data chunk. With prioritization of small files, as described above, it may be possible to have five hundred files in one chunk, but not use up the entire capacity of the chunk (e.g. 5 GB used out of a 10 GB chunk).

In some embodiments, once configuration information has been gathered by a master, the master may initiate processes (e.g. programs, scripts, etc.) on the hosts. These processes, or worker threads, may grab data ready to be transferred, and sends the data through a NIC. Worker threads may also receive information about which NICs to send the data to. This may be called an available NIC queue. For example, if Host 2 has NICs 3 and 4 available, a master may inform a worker thread on Host 1 that NICs 3 and 4 are available to transfer data to.

The following is an example of data movement between four hosts where each host has two disk mounts and each disk mount has a primary and a mirror. The same algorithm applies to N hosts with X primary/mirror pairs. Data is moved in parallel on all hosts and disk mounts. In this example, data is moved in two steps. The bolded elements in the table below illustrate the first step of data movement and further illustrated in FIG. 2. The second step is similar to the first step, but is not bolded in the below table and is not illustrated in FIG. 2.

TABLE 1

| Primary/Mirror | Content ID | Host | Disk |
| --- | --- | --- | --- |
| M | 1 | Host2 | Disk3 |
| P | 1 | Host 1 | Disk1 |
| M | 2 | Host2 | Disk4 |
| P | 2 | Host1 | Disk2 |
| M | 3 | Host3 | Disk5 |
| P | 3 | Host2 | Disk3 |
| M | 4 | Host3 | Disk6 |
| P | 4 | Host2 | Disk4 |
| M | 5 | Host4 | Disk7 |
| P | 5 | Host3 | Disk5 |
| M | 6 | Host4 | Disk8 |
| P | 6 | Host3 | Disk6 |
| M | 7 | Host1 | Disk1 |
| P | 7 | Host4 | Disk7 |
| M | 8 | Host1 | Disk2 |
| P | 8 | Host4 | Disk8 |

Primary/Mirror = P or M (mirror or primary)
Content ID = A primary mirror pair share the same content id
Host = The name of a host in the cluster.
Disk = The name of a disk in the cluster.

Figure 2:
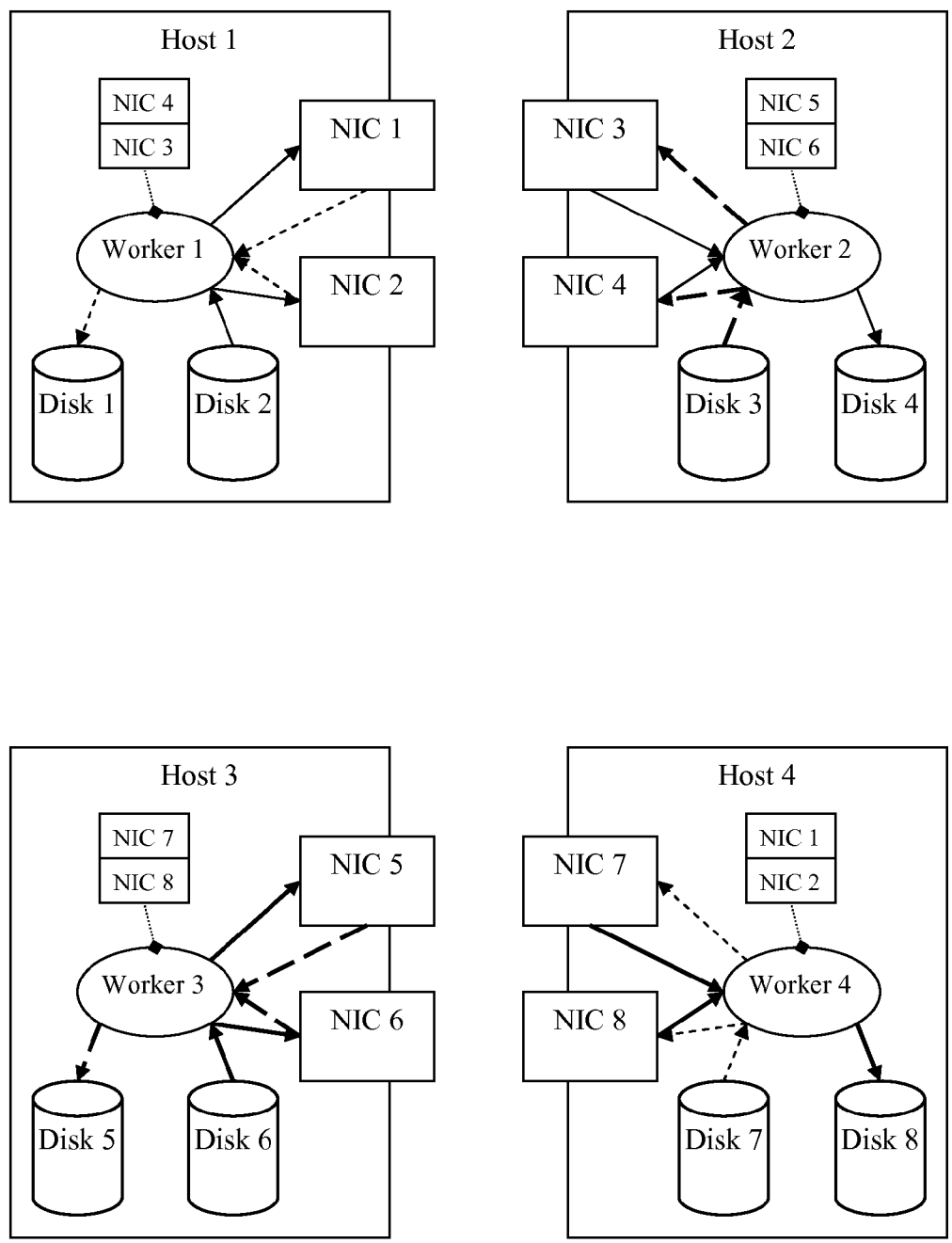
FIG. 2 illustrates a primary-mirror multi-host system 20 in accordance with some embodiments.

FIG. 2 illustrates a primary-mirror multi-host system 20 in accordance with some embodiments. Normal arrows, bold arrows, dashed arrows, and dashed bold arrows represent data movement. Following Table 1, FIG. 2 illustrates primary-mirror multi-host system 20, which includes Hosts 1, 2, 3, and 4. Each host has a worker thread, two NICs, an available NIC queue, and two disks. For example, Host 1 has Worker Thread 1, NICs 1 and 2, NIC 3 and 4 in the available NIC queue, and disks 1 and 2. As illustrated in Table 1, Content ID 2 has a primary on Host 1 Disk 2, and a mirror on Host 2 Disk 4. When Worker Thread 1 is told to copy data from Disk 2, it first checks its available NIC queue to determine which NIC to send data to. As illustrated in FIG. 2, two NICs are available for Worker Thread 1 to use (NICs 3 and 4), so Worker Thread 1 will send data to Host 2 via NICs 3 and 4. This is illustrated by the normal arrow. Contemporaneously, Worker Thread 4 is sending data from Host 4 Disk 7 to Host 1 via NICs 1 and 2 because NICs 1 and 2 were in Worker Thread 4's available NIC queue. It should be noted that at no time is any disk being written to and read from. Only one operation is performed on any disk. In FIG. 2, Disk 1 is only being written to, Disk 2 is only being read from, Disk 3 is only being read from, Disk 4 is only being written to, and so on.

Though FIG. 2 illustrates four hosts, with each host having two NICs, two disks, one worker thread, and two NICs in the available NIC queue, the enhanced techniques described herein are not limited to such a configuration. For example, a host may have many more disks, and many more NICs. A host may also be transferring data to more than one other host at a time (e.g. one host sending data to four other hosts). If a host had eight NICs, it is possible for the host to send data to two NICs on four different hosts, thereby utilizing all eight NICs on itself.

Once data movement has commenced, the available NIC queue change. In some embodiments, it may be preferable to have a dynamic NIC queue. For example, many data transfer operations may take varying amounts of time to complete. If a data transfer operation finishes before another (may be due to having 500 small files in one data chunk), the worker handling the completed data transfer operation will be free and idle. When a worker is available on the source, such as after completing a job, the worker places a reference to a NIC on the target that it was using on a NIC queue. The worker then gets a NIC off of the NIC queue for its target, gets a list of files to be copied, or moved, and starts the copy.

Figure 3:
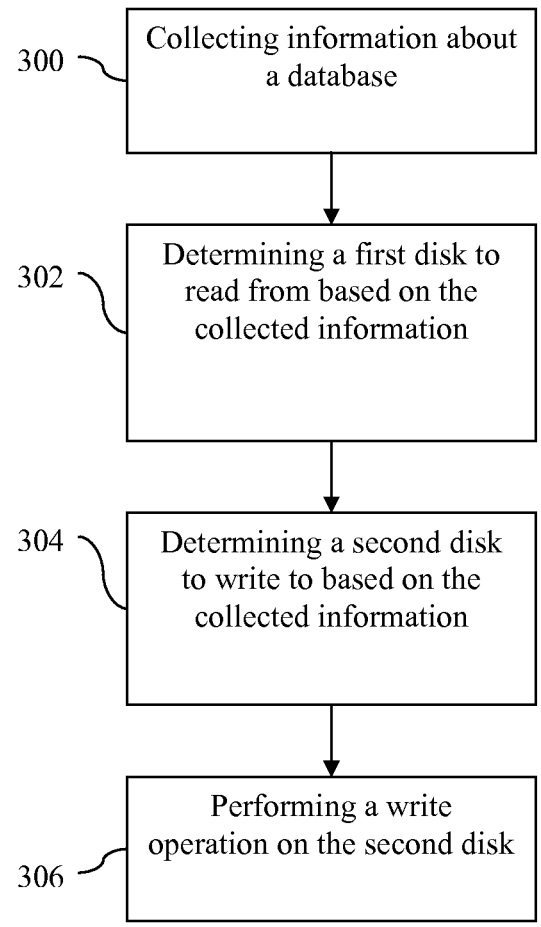
FIG. 3 is a flowchart of a method to process information in accordance with some embodiments.

FIG. 3 illustrates a method to process information in accordance with some embodiments. In step 300, information about a database is collected. In step 302, a first disk to read from is determined based on the collected information. In step 304, a second disk to write to is determined based on the collected information. In step 306, a write operation is performed on the second disk.

Figure 4:
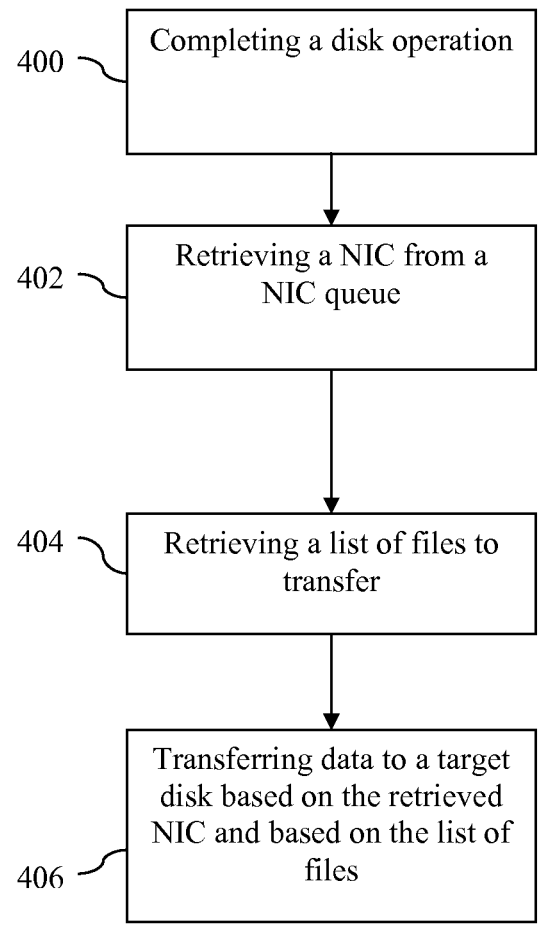
FIG. 4 is a flowchart of a method to process information in accordance with some embodiments.

FIG. 4 illustrates a method to process information in accordance with some embodiments. In step 400, a disk operation is completed. In step 402, a NIC is retrieved from a NIC queue. In step 404, a list of files to transfer is retrieved. In step 406, data is transferred to a target based on the retrieved NIC and based on the list of files.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for processing information, comprising:
   collecting configuration information about a database, wherein the database is accessed by a host system, wherein the host system is associated with a set of network interface cards (NIC) and a NIC queue, wherein the host systems includes a set of disks, wherein each disk of the set of disks includes primary and mirror disks;
   based on the collected configuration information, planning migration of data of the database, wherein the planning includes creating first and second lists for the host system, wherein the first list of the host system includes a set of primary disks and the second list of the host system includes a set of mirror disks, wherein creating the first and second lists comprises ordering the lists such that a read operation is performed on the set of primary disks and a write operation is performed on the set of mirror disks;
   evaluating network throughput of the set of network interface cards;
   based on the evaluation, selecting first and second network interface cards from the NIC queue;
   determining a first disk to read from based on the collected information, wherein data is read from the first disk using the first NIC;
   determining a second disk to write to based on the collected information; and
   performing a write operation on the second disk using the second NIC.

2. The method as recited in claim 1, further comprising performing a read operation on the first disk.

3. The method as recited in claim 2, wherein the write operation and read operation are performed contemporaneously.

4. The method as recited in claim 3, wherein the write operation is the only operation performed on the second disk at a time.

5. The method as recited in claim 3, wherein the read operation is the only operation performed on the first disk at a time.

6. A system for processing information, comprising a database, a first disk, a second disk, and a processor configured to:
   collect configuration information about a database, wherein the database is accessed by a host system, wherein the host system is associated with a set of network interface cards (NIC) and a NIC queue, wherein the host systems includes a set of disks, wherein each disk of the set of disks includes primary and mirror disks;

plan, based on the collected configuration information, migration of data of the database, wherein the plan includes create first and second lists for the host system, wherein the first list of the host system includes a set of primary disks and the second list of the host system includes a set of mirror disks, wherein creating the first and second lists comprises ordering the lists such that a read operation is performed on the set of primary disks and a write operation is performed on the set of mirror disks;

evaluate network throughput of the set of network interface cards;

based on the evaluation, select first and second network interface cards from the NIC queue;

determine the first disk to read from based on the collected information, wherein data is read from the first disk using the first NIC;

determine the second disk to write to based on the collected information; and perform a write operation on the second disk using the second NIC.

7. The system as recited in claim 6, the processor further configured to perform a read operation on the first disk.

8. The system as recited in claim 7, wherein the write operation and read operation are performed contemporaneously.

9. The system as recited in claim 8, wherein the write operation is the only operation performed on the second disk at a time.

10. The system as recited in claim 8, wherein the read operation is the only operation performed on the first disk at a time.

11. A computer program product for processing information data, comprising a computer readable non-transitory medium having program instructions embodied therein for:

collecting configuration information about a database, wherein the database is accessed by a host system, wherein the host system is associated with a set of network interface cards (NIC) and a NIC queue, wherein the host systems includes a set of disks, wherein each disk of the set of disks includes primary and mirror disks;

based on the collected configuration information, planning migration of data of the database, wherein the planning includes creating first and second lists for the host system, wherein the first list of the host system includes a set of primary disks and the second list of the host system includes a set of mirror disks, wherein creating the first and second lists comprises ordering the lists such that a read operation is performed on the set of primary disks and a write operation is performed on the set of mirror disks;

evaluating network throughput of the set of network interface cards;

based on the evaluation, selecting first and second network interface cards from the NIC queue;

determining a first disk to read from based on the collected information, wherein data is read from the first disk using the first NIC;

determining a second disk to write to based on the collected information; and performing a write operation on the second disk using the second NIC.

12. The computer program product as recited in claim 11, further comprising machine readable code for performing a read operation on the first disk.

13. The computer program product as recited in claim 12, wherein the write operation and read operation are performed contemporaneously.

14. The computer program product as recited in claim 13, wherein the write operation is the only operation performed on the second disk at a time.

15. The computer program product as recited in claim 13, wherein the read operation is the only operation performed on the first disk at a time.

* * * * *